Figure 6:
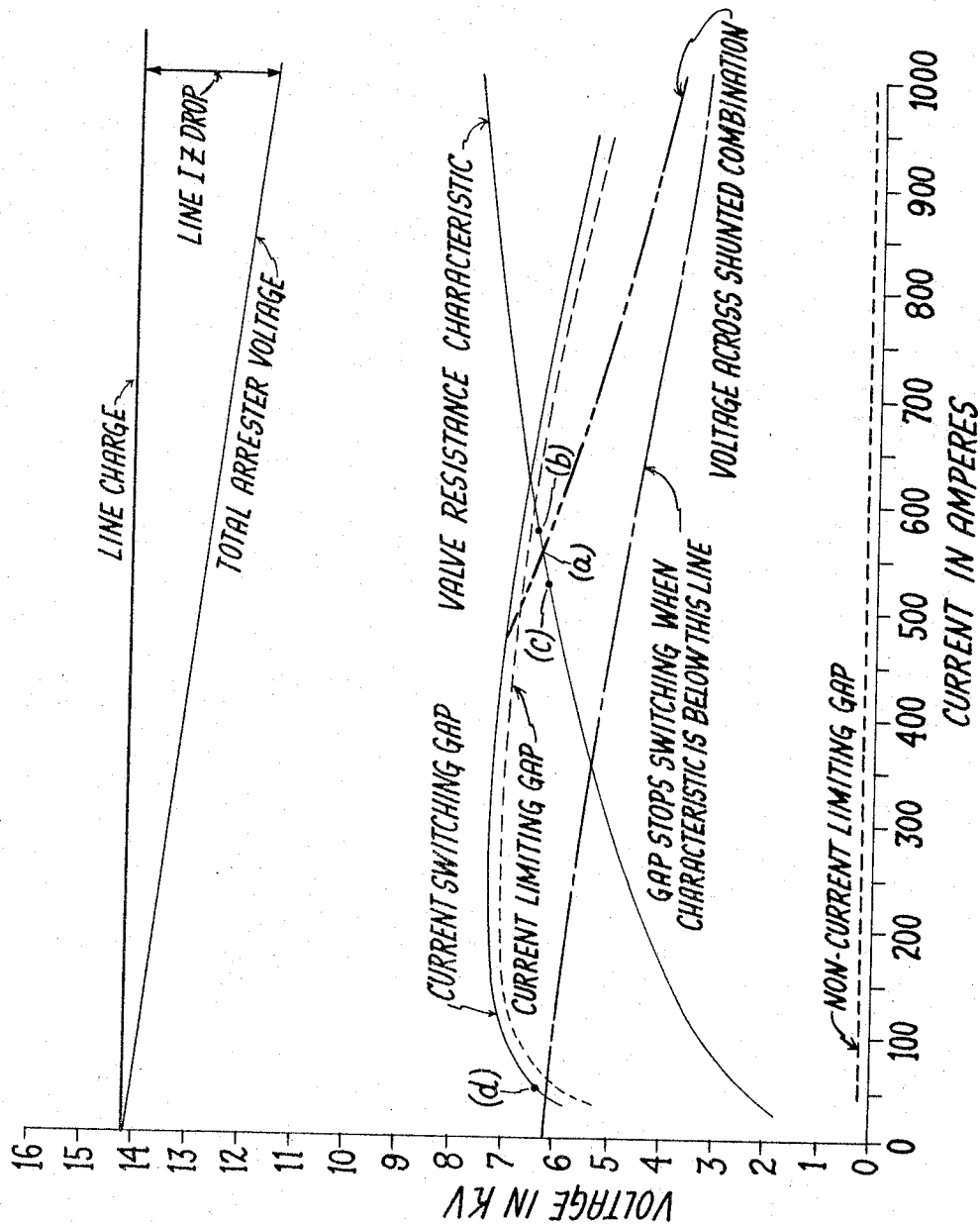
Figure 7A:
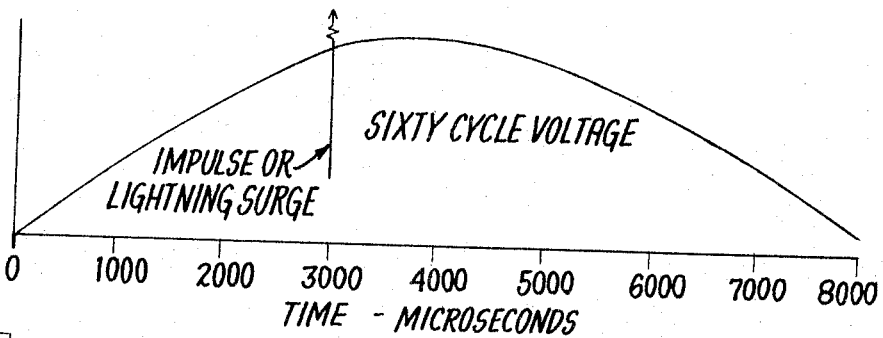
Figure 7B:
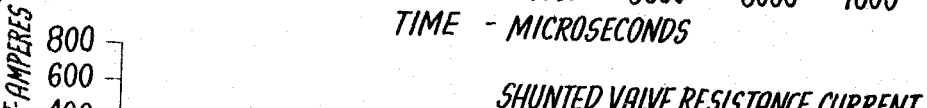
Figure 7C:
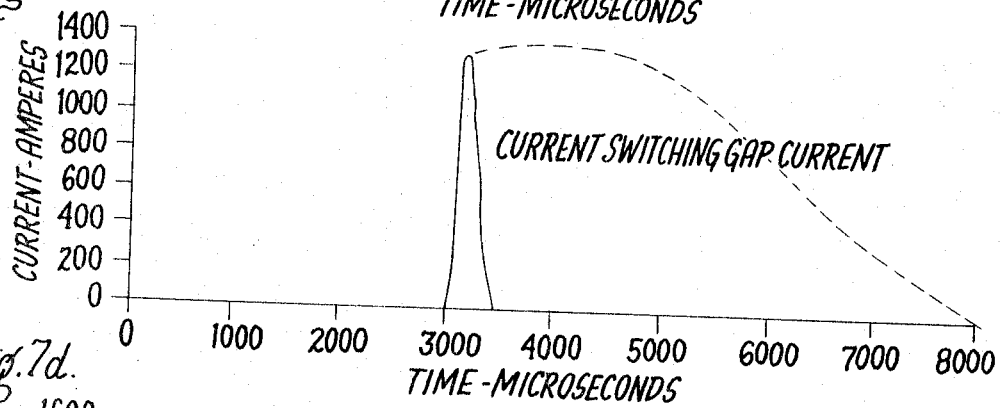
Figure 7D:
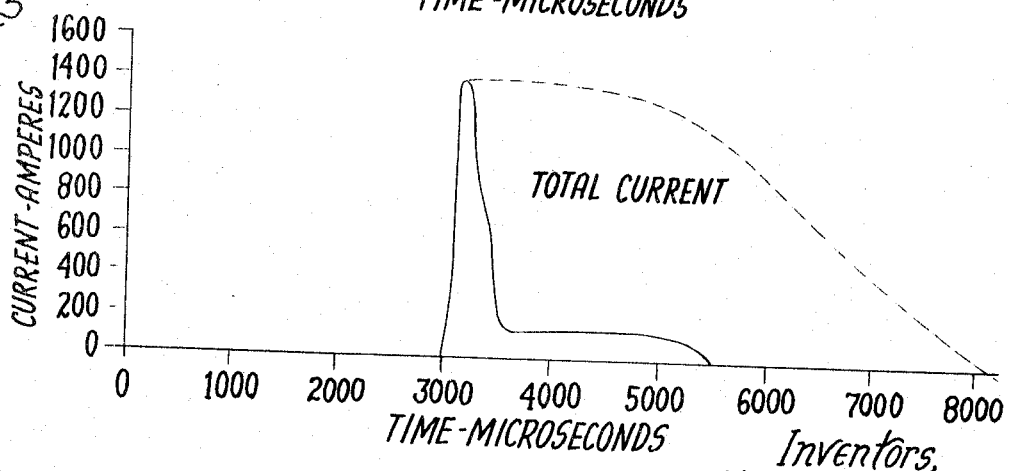

May 16, 1967 E. C. SAKSHAUG ET AL 3,320,482
LIGHTNING ARRESTER FOR HIGH ENERGY SWITCHING SURGES
Filed June 2, 1964 5 Sheets-Sheet 1
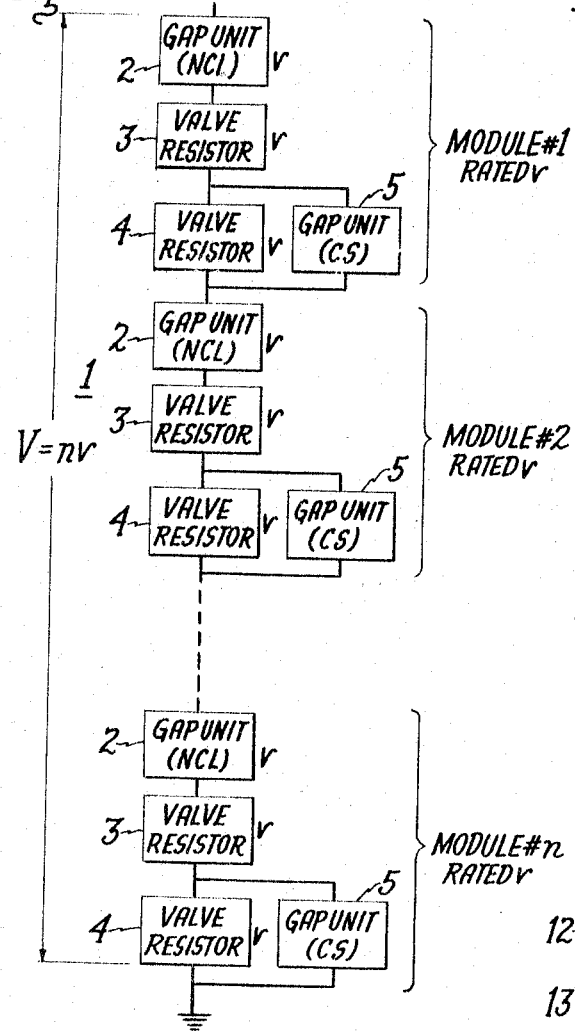
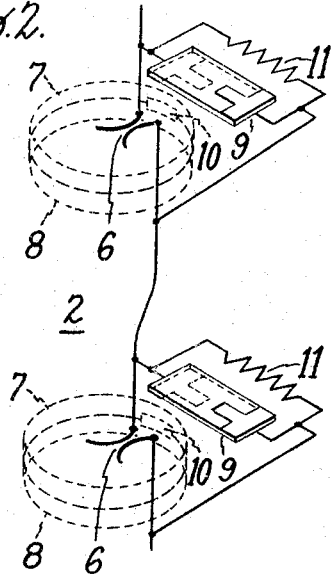
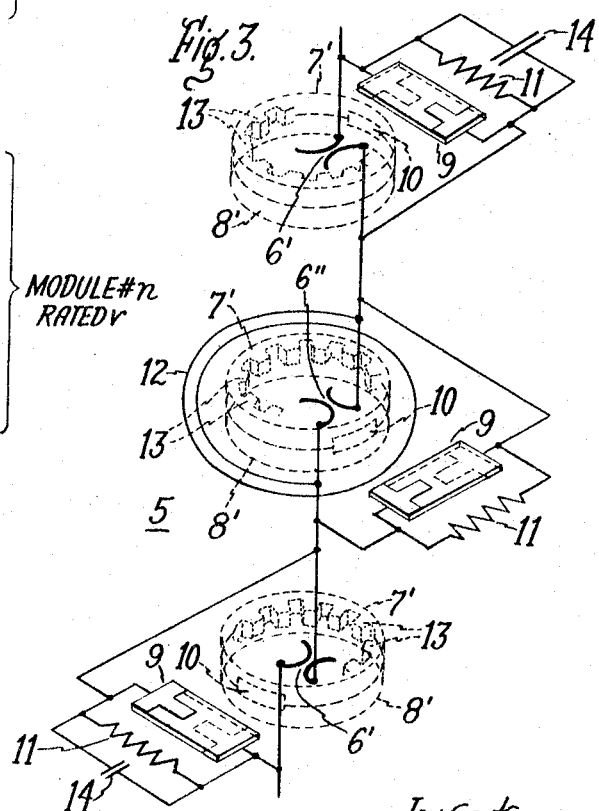
Inventors,
Eugene C. Sakshaug,
Earl W. Stetson
by Gilbert P. Tarlton
Their Attorney.

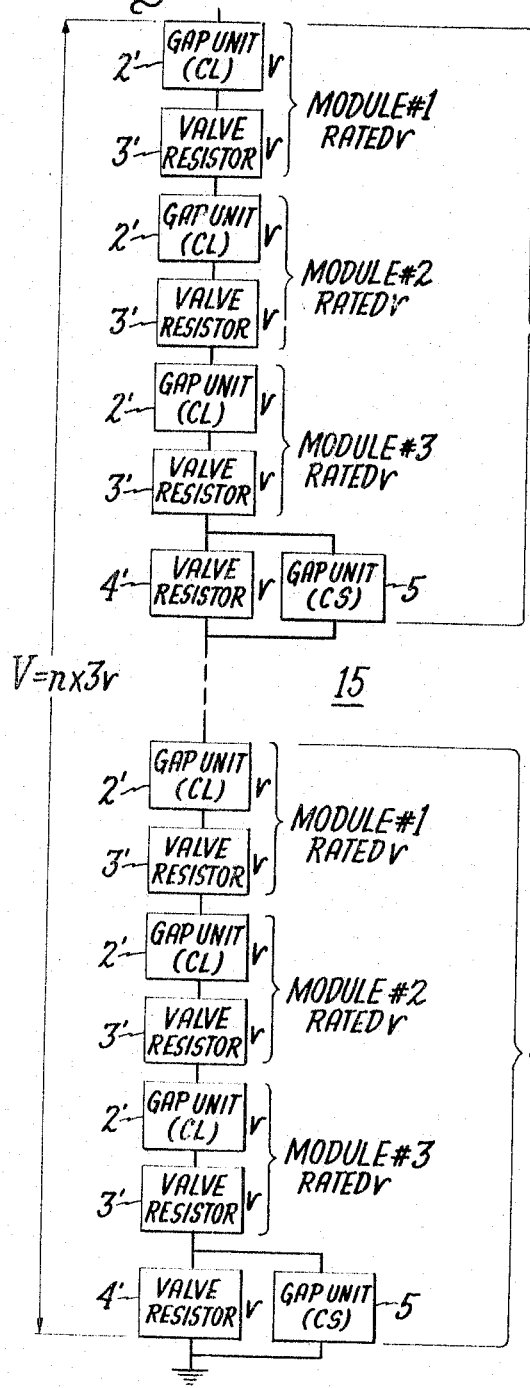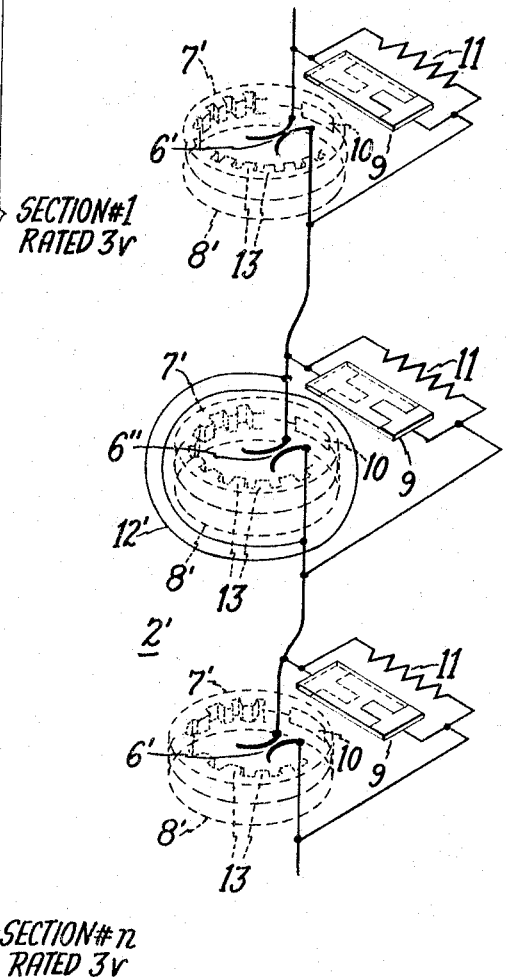

Inventors,
Eugene C. Sakshaug,
Earl W. Stetson,
by Gilbert P. Tarlton
Their Attorney.

May 16, 1967 E. C. SAKSHAUG ETAL 3,320,482
LIGHTNING ARRESTER FOR HIGH ENERGY SWITCHING SURGES
Filed June 2, 1964 5 Sheets-Sheet 5

Inventors,
Eugene C. Sakshaug,
Earl W. Stetson,
by Gilbert P. Tarlton
Their Attorney.

United States Patent Office 3,320,482
Patented May 16, 1967

3,320,482
LIGHTNING ARRESTER FOR HIGH ENERGY SWITCHING SURGES
Eugene C. Sakshaug, Lanesborough, and Earl W. Stetson, Pittsfield, Mass., assignors to General Electric Company, a corporation of New York
Filed June 2, 1964, Ser. No. 372,019
20 Claims. (Cl. 317—61)

This invention relates to lightning arresters and more particularly to improvements in valve type lightning arresters for extra high voltage service.

A lightning arrester is like an electrical safety valve which allows excessive electrical pressure or voltage to escape to ground and thus not rupture the electrical insulation of a protected device or system, the purpose of the electrical insulation being, of course, to contain or prevent the escape to ground of the normal operating voltage of the system or apparatus. In its simplest form a valve type lightning arrester comprises a spark gap in series with a valve type resistor. By valve type resistor is meant a resistor whose resistance is a practically instantaneous inverse function of the voltage across it. Such an arrester is connected between a live or charged part of a system or apparatus to be protected against overvoltage and ground. Under normal voltage conditions all the voltage is across the spark gap, whose resistance before sparkover is practically infinite compared to that of the valve resistor, and practically no current flows through the arrester. On the occurrence of a transient overvoltage of predetermined magnitude as determined by the gap's sparkover characteristic, which overvoltage can be produced either by lightning or a switching surge, the spark gap breaks down and a conducting path is established to ground through the lightning arrester. In the case of lightning, this conductive path is of very low resistance because the arc drop across the gap is very low compared to the lightning voltage and with practically all the voltage applied to the valve element its resistance decreases instantaneously to a relatively low value. Thus extremely large lightning discharge currents flow to ground through the arrester and the lightning surge is harmlessly conducted to ground without permitting the voltage to rise to a harmful value. Because of the extremely short duration of a lightning surge, a few microseconds, the current carrying parts of the lightning arrester are not damaged by the heavy current.

After the surge has subsided, the normal operating voltage tends to cause so-called power follow current to flow through the arrester. However, this voltage is so much less than the lightning voltage that the resistance of the valve element is able to reduce the power follow current to a value which the gap can interrupt.

As system operating voltages have increased over the years, the practice has been to connect in series similar lightning arrester modules or sections each consisting of a gap element and a valve element in series as this distributes the voltage along the lightning arrester better than if all the gap elements were at one end and all the valve elements at the other end. In practice, a typical module has a gap element comprising a plurality of series gaps and a valve element comprising one or more discs of nonlinear resistance material. Such modules have a voltage rating corresponding to the maximum 60 cycle R.M.S. voltage at which they will interrupt power follow current. One such rating is 6000 volts (6 kv.) and both the gap element and the valve element have this rating because at different times each must withstand approximately the same voltage, the valve element during power follow current flow and the gap element recovery voltage during interruption. Thus a 12 kv. arrester will consist of two such modules in series, a 48 kv. arrester will have 8 modules in series and so on. Usually the modules are stacked inside an elongated porcelain housing having an electrical terminal at each end. However, there is a practical limit to the length of such a housing and hence to the voltage rating of the arrester it contains and for still higher voltages such housings are stacked in series.

A comparatively recent improvement in valve type lightning arrester design involves the application of the magnetic arc blow out principle theretofore used in circuit breakers to the series gap for the purpose of increasing its arc voltage (effective resistance) so that the series gap itself absorbs at least some of the energy of the power follow current thus making it possible to reduce the size of, or even eliminate, the valve resistor. In other words, the total effective resistance of the arrester is the sum of the resistance of the valve resistor and the arc drop (or effective resistance) of the series gap.

A problem encountered in the design of valve type lightning arresters is that of protecting them against the destructive heating effects of switching surge energy they must be able to absorb without also decreasing the protection against overvoltage that they provide. Switching surges are surges caused by energizing or de-energizing a transmission line or cable by such means as opening or closing a circuit breaker. The surges produced may be and often are high enough to cause arrester sparkover with the result that the arrester is required to discharge the energy stored in the line. The energy stored in a charged transmission line or cable is equal to ½ $CE^2$ where C is the capacitance of the line or cable, and E is the voltage to which the line is charged. Since the maximum charge voltage is proportional to system operating voltage, the energy stored increases approximately as the square of the system operating voltage. At system operating voltages of about 230 kv. (RMS line to line of a three phase 60 cycle per second power system) the combined lightning surge and power follow current duty on an arrester about equals the switching surge duty. At voltages of 345 kv. and above, and on cables operating at lower voltage, the switching surge duty has increased to a point where it becomes an acute problem. The reason the problem becomes acute at lower cable voltages than open air transmission line voltages is that cables have a higher capacitance per unit length. In the case of open air transmission lines the length is generally proportional to the voltage. However, due to the practice of using bundled conductors at the higher line voltages the capacitance increases more than in proportion to the length so that both the E and C factors of the switching surge energy equation usually go up as the line length increases.

Two ways of reducing the destructive heating effect of this switching surge duty are (1) to increase the volume of valve resistor material per unit of rating without increasing its resistance so that when viewed as a heat sink its heat absorbing capacity is increased, and (2) to increase the effective resistance of the gap element so as to cause it to absorb a substantial portion of the switching surge energy. Each of these methods has merit, and both have been employed at voltages up to and including 345 kv. At voltages of 500 kv. and 700 kv. and on high voltage cable systems, however, the amount of energy to be absorbed is greatly increased because C as well as E have materially increased. Furthermore, switching surge discharge currents are so large as to cause excessive heating of the gap element unless the resistance of the arrester is increased to reduce the magnitude of these currents. Resistance may be increased by increasing the resistance of the valve element or number of valve elements, but this also increases the lightning surge discharge voltage of the arrester and thus decreases its overvoltage protecting ability. Therefore, this approach alone is not satisfactory.

It has been proposed to solve the remaining lightning discharge aspect of the problem by shunting the extra resistance, which has been added to limit the switching surge current and aid in absorption of energy with an ordinary arc quenching type of spark gap which sparks over on lightning surges but not on the lower magnitude switching surges. Thus the extra resistance is removed by the short circuiting action of the spark gap during lightning surges but is available for limiting switching surge current.

Such an arrangement has a number of shortcomings. One is that the extra resistance is not available for helping limit the power follow current after a lightning surge has passed. Another is that the impulse sparkover setting of the shunt gap is highly critical and must be high because if it should spark over on an unusually high switching surge voltage the lightning arrester would be destroyed by the extra heavy switching surge current which would not be limited by the then short circuited extra resistance.

In accordance with this invention, the problems outlined above are solved by connecting a special kind of gap across the added resistance, specifically a current switching gap. By a current switching gap is meant a gap which in a few hundred microseconds after its sparkover on impulse, which is an order of magnitude of time much shorter than a half cycle of a 60 cycle per second wave, will develop an arc voltage of from about .5 of to equality with or slightly higher than its impulse sparkover voltage (at rates of voltage rise producing sparkover at times greater than about .3 microseconds). Such a gap can have a relatively low impulse sparkover setting so as to improve the arrester performance on lightning surges by preventing any substantial voltage being developed across the added resistance when a lightning surge strikes the arrester. However, its arc voltage, which although it increases relatively slowly compared with the few microseconds duration of a lightning surge, increases relatively rapidly with respect to the power follow current, a half cycle of which lasts for about 8333 microseconds, so that within a small fraction of a half cycle of power follow current substantially all of the current is forced or "switched" into the added resistance which then is effective to limit the power follow current and thus reduce the interrupting duty of the main series gap.

During switching surges, which generally are of lower peak magnitude than lightning surges but which last very much longer, the current switching shunt gap may or may not spark over depending on the peak voltage of the switching surge which is a random phenomenon dependent on many system variables. When it does not spark over the total resistance is available for the full duration of the surge to limit the arrester discharge current and to absorb the switching surge energy. However, when it does spark over it rapidly develops a high voltage and "switches" the discharge current into the added resistance so that the operation is essentially the same as though it had not sparked over. Thus added resistance is always available for limiting the switching surge discharge current and for absorbing the surge energy.

While the power of a lightning surge discharge is very much higher than the power of a switching surge discharge, the destructive heating effect (energy) of the latter greatly exceeds that of the former at system operating voltages in the E.H.V. range (345 kv. to 700 kv. and above) because of the much longer duration of the latter, energy being equal to the product of power and time and the power of a switching surge discharge being proportional to the square of the system operating voltage.

An object of the invention is to provide a new and improved valve type lightning arrester.

Another object of the invention is to provide an improved valve type lightning arrester for protecting three phase systems having operating line to line voltages exceeding 230 kv. and particularly when exceeding 345 kv. such as at 500 kv. and 700 kv. or higher.

A further object of the invention is to provide a new and improved extra high voltage lightning arrester which will absorb switching surge discharge currents without raising its overvoltage protective level.

The invention will be better understood from the following description taken in connection with the accompanying drawings and its scope will be pointed out in the appended claims.

In the drawings,

FIG. 1 is a diagrammatic illustration of an embodiment of the invention,

FIG. 2 is a schematic illustration of a suitable form of non-current limiting or arc quenching gap used in FIG. 1, FIG. 3 is a schematic illustration of a suitable current switching gap used in FIG. 1, FIG. 4 is a view similar to FIG. 1 of a modification of FIG. 1 which is particularly suitable for use at lower voltages, FIG. 5 is a schematic illustration of the current limiting gaps used in FIG. 4, FIG. 6 is a graph showing representative volt-ampere characteristics of the principal circuit elements of FIGS. 1 and 4, FIG. 7 is a set of current versus time graphs for illustrating the operation of the invention in interrupting power follow current, and FIG. 8 is a set of current versus time graphs for illustrating the operation of the invention during switching surges.

Referring now to the drawings and more particularly to FIG. 1, there is shown therein a lightning arrester 1 having a rating of V volts and consisting of $n$ modules in series each having a rating of $v$ volts. Each module comprises in series a gap unit 2, a main valve resistor 3, and an auxiliary switching surge energy absorbing valve resistor 4 shunted by a current switching gap unit 5. As has previously been explained, each valve resistor and each gap unit also has a voltage rating $v$.

FIG. 2 shows the principal details of a suitable form of non-current limiting or arc quenching series gap unit 2 used in FIG. 1. As shown it comprises a multiplicity of serially connected horn gaps 6 between discs 7 and 8 of porous ceramic material whose adjacent or contiguous surfaces are formed to provide a chamber where the arc between the horn gap electrodes may be extended and cooled by the inherent or auto-electromagnetic interaction of the gap current flowing through its electrodes between their connection terminals and the magnetic flux produced by such current. As shown each gap 6 comprises a pair of electrodes which converge from their connection terminals to a point of minimum spacing and then diverge beyond that point. The point of minimum spacing is the point where the gap sparks over and is dimensionally closely controlled. The principal purpose of this construction is to rapidly drive the arc once it is formed away from this point out along the diverging runners to the horns or tips of the electrodes so as to prevent burning the electrodes at the point of minimum spacing and thus altering the spacing and the gap voltage setting. Each gap 6 is preferably provided with a suitable form of preionizer 9 connected in shunt therewith which views or ionizes the gap space through a window 10 in the plates 7 and 8. The preionizer may be of any suitable form such as a pair of electrodes on opposite sides of a dielectric body to electrically stress the surface creepage path around the dielectric body so as to provide the desired amount of ionization for ionizing the gap space. Also connected in shunt with each gap 6 is a grading resistor 11 for maintaining the proper division of 60 cycle voltage between the serially connected gaps 6.

FIG. 3 shows the principal details of the current switching gap 5 of FIG. 1 which in addition to having a plurality of serially connected horn gaps 6' generally similar to horn gaps 6 of FIG. 2 has a series electromagnetic coil 12 shunted by a horn gap 6" for protecting the coil against voltage surges, and for giving the gap the desired current switching characteristic. The gaps 6' and 6" are enclosed between porous ceramic plates 7' and 8' generally similar to plates 7 and 8 of FIG. 2 except that they have internal teeth 13 in the arc chamber for providing a serpentine path for elongating the arc and causing the current switching gap to develop a relatively high arc voltage compared to that of the gap 2. In addition to preionizers 9 and grading resistors 11 at least some of the gap elements 6' are also shunted by so-called upsetting capacitors 14 having different amounts of capacitance so that the voltage distribution across the individual gap elements 6' in response to steep wave front or transient voltage impulses such as lightning or switching surges will be nonuniform so that the gap elements will spark over sequentially thus lowering the sparkover voltage of the gap unit 5 as a whole.

Generally the operation of gap 5 shown in FIG. 3 is such that when a lightning discharge or transient voltage is impressed across it the individual gaps break down sequentially, but almost instantaneously, the breaking down of the coil shunting gap 6" serving to prevent overvoltage damage to the coil. Once the gaps have sparked over their horn gap effects increase their voltage which in the case of the coil shunting gap 6" forces more and more of the current through the coil 12 thus producing magnetic flux which reinforces the self-produced flux of the gaps and causes their arcs to be accelerated outwardly along the diverging horns and into the arc chambers and against the teeth 13 and into the porous plates 7' and 8'. This action is cumulative as the greater the voltage developed by gap 6" the greater the coil current and hence the greater the flux thus producing a stronger electromagnetic force on the arcs. In this manner, in a few hundred microseconds a comparatively large total arc drop or arc voltage is produced, this voltage being half the sparkover voltage or more up to and slightly exceeding the sparkover voltage of the gap unit.

Referring now to the modification shown in FIG. 4, it will be seen that this consists of lightning arrester 15 comprising $n$ sections in series, each comprising a plurality of similar modules, three being illustrated, plus a switching surge absorbing valve resistor 4' which is shunted by a current switching gap unit 5. Each module is generally similar to the modules shown in FIG. 1 except that its series gap units 2' are current limiting gap units, an example of which is shown in FIG. 5.

In both FIGS. 1 and 4, the valve resistors 3 and 4 may be identical although this is not essential and they consist of well-known nonlinear volt-ampere resistance characteristic material. Usually each is in the form of one or more discs of such material.

The details of a suitable form of current limiting series gap 2' are shown in FIG. 5. They are quite similar to those of the current switching gap 5 shown in FIG. 3 except that the coil 12' is made of a higher resistance material than the coil 12 in order not to develop as fast a rise of magnetic flux and as fast an increase in gap arc voltage or effective resistance. Also the voltage upsetting capacitors 14 of the current switching gap are not usually necessary and have been omitted.

FIG. 6 shows the approximate volt-ampere relations of the various circuit elements shown in FIGS. 1 through 5 and is provided for the purpose of explaining the operation of FIG. 1 and also FIG. 4 under switching surge conditions. The horizontal line labeled "Line Charge" represents the voltage per 6 kv. module to which a line protected by a lightning arrester has been charged by a switching operation. Such a line has a definite surge impedance Z so that surge current flowing through the line produces a voltage drop equal to IZ where I is the surge current. This is represented by the vertical vector labeled "Line IZ Drop," and the line labeled "Total Arrester Voltage" is the line charge minus the line IZ drop for different values of surge current. Assuming that the various modules shown in FIGS. 1 and 4 are rated 6 kv. and that the valve resistors 3, 3', 4 and 4' are identical, they will have a typical volt-ampere characteristic which is labeled "Valve Resistance Characteristic" in FIG. 6. The line labeled "Non-Current Limiting Gap" represents the volt-ampere characteristic of the gap 2 of FIGS. 1 and 2. The line labeled "Current Switching Gap" represents the volt-ampere characteristic of the gap 5 of FIGS. 1 and 3, and the curve labeled "Current Limiting Gap" represents the volt-ampere characteristic of the gap 2' of FIGS. 4 and 5. It should be understood that the valve resistance characteristic, the current switching gap characteristic and the current limiting gap characteristic curves are all for those units considered by themselves and not as a shunted and/or series combination.

In the case of the arrester shown in FIG. 1, if the current switching gap 5 does not spark over on the occurrence of the switching surge, the current will be limited to about 550 amperes at which current the voltage of each valve resistance 3 and 4 is about half the total arrester module voltage which at that point is about 12.8 kv. This is because the current as to each module will be limited by two equal valve resistors 3 and 4 in series, the relatively low voltage of the non-current limiting series gap 2 being ignored. The two resistors 3 and 4 are then operating at point $(a)$ on the Valve Resistance Characteristic curve.

If however, the current switching gap 5 of FIG. 1 also sparks over on a switching surge, the current attempts to rise to a level determined by the valve resistor 3 alone and this current may rise to a level of greater than 1000 amperes. For any such current, the voltage across the valve resistor 4 and the current switching gap unit 5 in shunt therewith will then be the difference between the total arrester voltage and the voltage of the valve resisor 3. This voltage is represented by the line labeled "Voltage Across Shunted Combination" in FIG. 6. Within a few microseconds, shunt gap voltage begins to develop and the current begins to decrease. Current decreases to a point where the circuit is balanced, and such a balance point occurs at around 570 amperes. Here the total arrester voltage is about 12.7 kv. The voltage across the series valve resistor 3 is about 6.5 kv., and it is operating at point $(b)$ on the Valve Resistance Characteristic curve. The current in the shunted valve resistor 4 is about 520 amperes and the voltage corresponding to this current is about 6.2 kv., which operating condition is represented by point $(c)$ on the Valve Resistance Characteristic curve. The total arrester voltage is then $6.2+6.5=12.7$ kv., neglecting the small voltage in the non-current limiting gap 2. A current of 570 minus 520 equals 50 amperes is then flowing in the shunt gap 5 which is then operating at point $(d)$ on the Current Switching Gap Characteristic curve, and the voltage across the shunt gap is seen to be very nearly 6.2 kv. or about the same as that of the shunted valve resistor 4 and the circuit is in balance with these currents flowing. In other words, very soon after the current switching gap 5 sparks over, the circuit returns to a condition almost the same as though the current switching gap 5 had not sparked over and the valve resistor 4 is available for limiting switching surge current and absorbing switching surge energy.

Switching surge operation with fewer valve resistors 4' shunted, by using current limiting series gaps 2' as is shown in FIG. 4 is similar to that just described except that the series current limiting gaps 2' have a voltage across them equal to the curve labeled "Current Limiting Gap" in FIG. 6.

On power follow current operation subsequent to a lightning surge, the "Total Arrester Voltage" for a 6 kv. module is only 6 kv.×√2=8.48 kv. at the crest of the circuit voltage. FIG. 6 shows that obviously the arrester of FIG. 1 or FIG. 4 will easily reduce current to a low value at this relatively low voltage.

Power follow current operation for FIG. 1 correlating current with time, is illustrated in FIG. 7 where 7a shows for comparative purposes the duration of a lightning surge and a half cycle of 60 cycle voltage. Curve 7b illustrates the shunted valve resistor 4 current. FIG. 7c shows the same thing for the current in the current switching gap 5. FIG. 7d shows that the total arrester current is rapidly reduced to zero and as shown this can occur before the normal 60 cycle voltage zero. The dashed curves in FIGS. 7c and 7d represent shunt gap current and total current if the shunt gap were a simple non-current limiting or arc quenching gap similar to gap 2 of FIGS. 1 and 2. Thus the use of a current limiting gap 5 in combination with a shunted valve resistor produces very much more effective power follow current limitation.

Figure 8A:
Figure 8B:
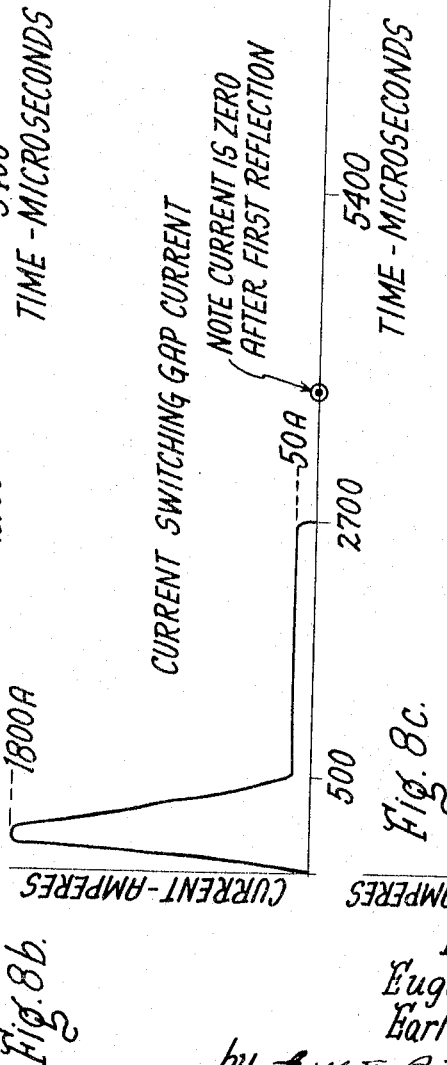
Figure 8C:
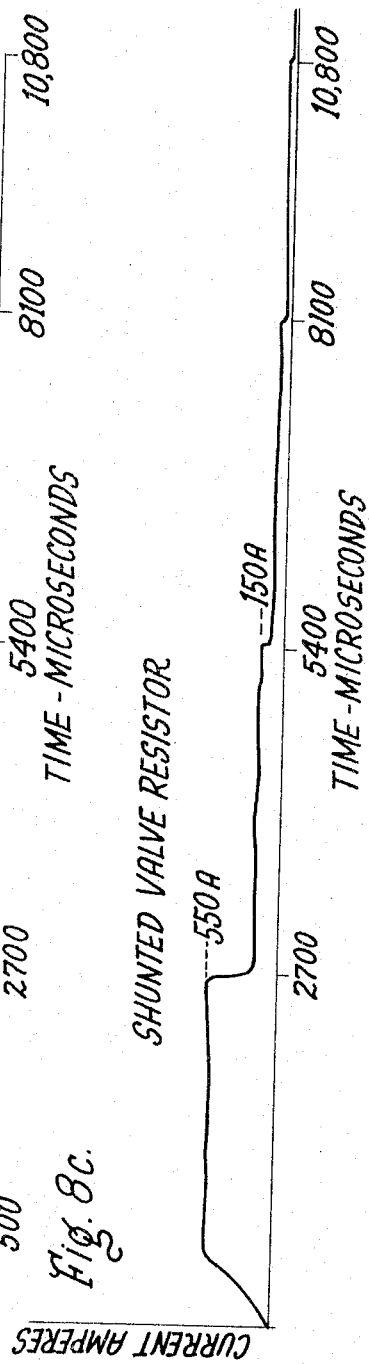

FIG. 8 is an example of the current-time relations in a module of the arrester of FIG. 1 on switching surge operation. FIG. 8a shows the total arrester current, which quickly rises to a high value and is then rapidly and drastically reduced by the operation of the current switching gap 5 in switching current into the extra valve resistor 4 so that in a time interval of a few hundred microseconds the total current falls from 1800 amperes to 600 amperes in the example shown. After about 2700 microseconds, the surge is reflected by the line and falls to about 150 amperes at which it continues until the next reflection at about 5400 microseconds. Successive reflections of the switching surge cause reduction in total current in the arrester until it is reduced to zero. Because of the characteristic shown in FIG. 6 of the shunt current switching gap, the shunt gap arc is extinguished after the first reflection, as shown in FIG. 8b. During subsequent reflections all of the arrester current flows through the shunted valve resistor 4 as well as through the series valve resistor 3. The shunted valve resistor current is shown in FIG. 8c and it progressively decreases during subsequent reflections of the surge until the surge energy is all dissipated.

The operation of FIG. 4 is generally the same as FIG. 1 except that switching surge energy and follow current energy are absorbed by the current limiting gap 2'. Other things being equal, the arrester shown in FIG. 4 is less adapted for use at very high circuit voltages than the circuit of FIG. 1 because not only does it have less total valve resistance, but the very high switching surge energies at very high voltages would tend to overheat and impair the operating characteristics of a current limiting gap. It is for this reason that the series gaps 2 of FIG. 1 are made non-current limiting so that the energy they are required to absorb will be very much less than in the case of a current limiting series gap. It should be understood, however, that by selecting proper valve resistor elements either the circuit of FIG. 1 or the circuit of FIG. 4 can be used for any system voltage.

In FIG. 1 the arrester has a total resistance $R=R_1+R_2$ where $R_1$ is $n$ times the resistance of valve resistor 3 and $R_2$ is $n$ times the resistance of added switching surge energy absorbing and power follow current limiting resistor 4. In FIG. 4 the arrester has a total resistance $R=R_1+R_2$ when $R_1$ is three $n$ times the resistance of 3' and $R_2$ is $n$ times the resistance of 4'. In either case R is proportional to the product of the square of the rated voltage S of a system or circuit to be protected and its capacitance to ground i.e. to its switching surge energy. $R_1$ is the maximum allowable resistance for providing lightning surge overvoltage protection and is proportional to the rated voltage V of the arrester or roughly proportional to the rated system voltage S. $R_2$ is the amount of additional resistance necessary in order that the arrester can sustain switching surges without undue damage.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What we claim as new and desire to secure by Letters Patent of the United States is:

1. In a valve type lightning arrester having at least one spark gap in series with at least one nonlinear resistance valve means, a current switching spark gap connected in shunt with a portion of said valve means.

2. In a valve type lightning arrester having at least one spark gap in series with at least one nonlinear resistance valve means, said valve means having an intermediate terminal in addition to end terminals, and a current switching spark gap connected between said intermediate terminal and one end terminal of said valve means.

3. In a valve type lightning arrester having at least one spark gap in series with at least one nonlinear resistance valve element, an additional nonlinear resistance valve element connected in series with said spark gap and the first nonlinear resistance valve element, and a current switching spark gap connected in shunt with said additional nonlinear resistance valve element.

4. A lightning arrester as in claim 1 in which said current switching spark gap is provided with means for increasing its arc voltage within a few hundred microseconds after its sparkover to at least half its sparkover voltage.

5. A lightning arrester as in claim 2 in which said current switching spark gap is provided with means including a gap current responsive element for increasing the gap's arc voltage within a few microseconds after its sparkover to between half of and substantial equality with its sparkover voltage.

6. A lightning arrester as in claim 3 in which said current switching gap is provided with means including a gap voltage responsive element for increasing the gap's arc voltage within a few microseconds after its sparkover to between half of and substantial equality with its sparkover voltage.

7. A lightning arrester as in claim 1 in which said current switching spark gap is provided with means including a gap current responsive element and a gap voltage responsive element for increasing the gap's arc voltage within a few microseconds after its sparkover to between half of and substantial equality with its sparkover voltage.

8. A lightning arrester as in claim 2 in which said current switching spark gap is a multiplicity of serially connected horn gaps each enclosed in an internally toothed porous ceramic arc drawout and arc cooling chamber.

9. A lightning arrester as in claim 3 in which said current switching spark gap is a multiplicity of serially connected coaxially stacked horn gaps each enclosed in an internally toothed porous ceramic arc drawout and arc confining chamber and an electromagnetic coil coaxially adjacent at least one of said horn gaps and connected in shunt with one of said horn gaps.

10. A lightning arrester as in claim 1 in which said current switching spark gap is a multiplicity of serially connected coaxially stacked horn gaps each enclosed in an internally toothed porous ceramic arc drawout and arc confining chamber, and an electromagnetic coil coaxially adjacent to at least one of said horn gaps and connected in shunt with one of said horn gaps, a plurality of said horn gaps being shunted by a preionizer.

11. A lightning arrester as in claim 2 in which said current switching spark gap is a multiplicity of serially connected coaxially stacked horn gaps each enclosed in an internally toothed porous ceramic arc drawout and arc confining chamber, and an electromagnetic coil coaxially adjacent at least one of said horn gaps and connected in shunt with one of said horn gaps, a plurality of said horn gaps being shunted by resistive means for grading low frequency voltage distribution across the individual horn gaps.

12. A lightning arrester as in claim 3 in which said current switching spark gap is a multiplicity of serially connected coaxially stacked horn gaps each enclosed in an internally toothed porous ceramic arc drawout and arc confining chamber, and an electromagnetic coil coaxially adjacent to at least one of said horn gaps and connected in shunt with one of said horn gaps, a plurality of said horn gaps being shunted by capacitive means for upsetting the high frequency voltage distribution so as to cause sequential horn gap sparkover on steep front voltage impulses and lower the impulse sparkover setting of the current switching gap as a whole.

13. A lightning arrester as in claim 1 in which said current switching spark gap is a multiplicity of serially connected coaxially stacked horn gaps each enclosed in an internally toothed porous ceramic arc drawout and arc confining chamber, and an electromagnetic coil coaxially surrounding at least one of said horn gaps and connected in shunt with it, each of said horn gaps being shunted by a preionizer which views it, each of said horn gaps being shunted by resistive means for grading low frequency voltage distribution across said horn gaps, and each of said horn gaps being shunted by capacitive means for upsetting high frequency voltage distribution across said horn gaps so as to cause sequential horn gap sparkover on steep front voltage impulses and lower the impulse sparkover setting of the current switching gap as a whloe.

14. In a valve type lightning arrester for use on power circuits having high energy switching surges, said arrester having in series a main spark gap and a valve resistance means divided between two serially connected sections one of which has the maximum resistance allowable for providing lightning surge overvoltage protection of the system and other of which is added resistance required for absorbing switching surge energy, and a current switching spark gap connected in shunt with the added switching surge energy absorbing resistance section for effectively short circuiting the latter during lightning surges while forcing the arrester current through said added resistance section during switching surges and during power follow current interruption, said current switching spark gap having an electromagnetic coil for forcing its arc into a serpentine restricted volume porous ceramic walled arc drawout and cooling chamber.

15. A valve type lightning arrester rated V kv. for use on a three phase power system rated S kv. (line to line) where V is enough greater than $S/\sqrt{3}$ to provide power follow current interruption at the maximum actual voltage above S that the system is operated at, said arrester having in series a main spark gap and a valve resistance means with a total amount of valve resistance R which is proportional to $S^2 \times C$ where C is the capacitance to ground of the power system, R being divided between two series connected sections $R_1$ and $R_2$ where $R_1$ is directly proportional to V and $R_2$ is equal to $R-R_1$, $R_1$ being the maximum resistance allowable for providing lightning surge overvoltage protection and $R_2$ being added resistance for absorbing switching surge energy and limiting power follow current, and a current switching spark gap connected in shunt with $R_2$ for effectively short circuiting $R_2$ during lightning surges while forcing $R_2$ to perform an appreciable part of the switching surge energy absorbing and power follow current limiting duty of the arrester.

16. A lightning arrester as defined in claim 4 in which said main spark gap is a current limiting gap which absorbs a substantial part of the total switching surge and power follow current energies absorbed by the arrester as a whole.

17. A valve type lightning arrester comprising, in combination, a plurality of serially connected modules each comprising two serially connected valve resistors connected in series with an arc quenching spark gap, and a current switching spark gap connected in shunt with one of said resistors, said current switching spark gap having means for causing it to develop much more rapidly a much higher arc voltage than said arc quenching spark gap, said arc quenching spark gap having a higher sparkover voltage than said current switching spark gap.

18. A valve type lightning arrester for protecting a phase of a three phase system having a rated line to line voltage in the neighborhood of 700 kv., a plurality of similar serially connected modules each comprising two substantially identical valve resistors and two dissimilar spark gap units, one gap unit being a main gap, said resistors being connected in series with each other and with said main gap, the other gap unit being a shunt gap connected across one of said resistors, the main gap having a higher impulse sparkover voltage than the shunt gap, the main gap having an arc voltage substantially less than its sparkover voltage, the shunt gap having an arc voltage almost the same as its sparkover voltage.

19. A valve type lightning arrester comprising, in combination, a plurality of serially connected sections each comprising a plurality of modules connected in series with a valve resistor shunted by a current switching spark gap, each module comprising a current limiting spark gap connected in series with a valve resistor, said spark gaps each having means for causing it rapidly to develop an arc voltage of at least half its sparkover voltage, the sparkover voltage of the current switching gaps being lower than the sparkover voltage of the current limiting gaps.

20. A valve type lightning arrester for protecting a phase of a three phase system having a rated line to line voltage in the neighborhood of 500 kv., a plurality of serially connected sections each comprising $n$ current limiting gaps and $(n+1)$ substantially identical valve resistors all connected in series alternately, and a current limiting switching gap unit connected in shunt with one of said resistors, said current switching gap unit having a lower impulse sparkover voltage setting than said current limiting gap unit, all of the gap units having about the same arc voltage which is close to their low frequency sparkover voltage.

References Cited by the Examiner

UNITED STATES PATENTS

| 2,389,007 | 11/1945 | Strang et al. | 317—12 |
| 2,554,278 | 5/1951 | Teszner | 317—61 |
| 2,664,525 | 12/1953 | Diebold | 317—12 |
| 2,862,152 | 11/1958 | Ryden | 317—12 |
| 3,019,367 | 1/1962 | Kalb | 315—344 |
| 3,255,382 | 6/1966 | Wolf | 317—12 |
| 3,259,780 | 7/1966 | Stetson | 313—231 |

References Cited by the Applicant

"Electric Technology"—U.S.S.R. selected paper from (Russian) Electrichestvo, vol., 2, 1961, Pergannon Press, New York, London, Oxford, Paris.

MILTON O. HIRSHFIELD, *Primary Examiner.*

R. V. LUPO, *Assistant Examiner.*